United States Patent
Katano et al.

(10) Patent No.: US 8,546,034 B2
(45) Date of Patent: Oct. 1, 2013

(54) FUEL CELL SYSTEM

(75) Inventors: Koji Katano, Toyota (JP); Norio Yamagishi, Aichi (JP); Akihisa Hotta, Ichinomiya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 823 days.

(21) Appl. No.: 12/445,856

(22) PCT Filed: Nov. 19, 2007

(86) PCT No.: PCT/JP2007/072707
§ 371 (c)(1),
(2), (4) Date: Apr. 16, 2009

(87) PCT Pub. No.: WO2008/062890
PCT Pub. Date: May 29, 2008

(65) Prior Publication Data
US 2010/0209797 A1    Aug. 19, 2010

(30) Foreign Application Priority Data
Nov. 22, 2006 (JP) .................................. 2006-315927

(51) Int. Cl.
*H01M 8/04* (2006.01)
*B29C 39/00* (2006.01)

(52) U.S. Cl.
USPC ............................. 429/443; 429/444; 264/299

(58) Field of Classification Search
None
See application file for complete search history.

(56) References Cited

U.S. PATENT DOCUMENTS

| | | | |
|---|---|---|---|
| 4,848,727 A * | 7/1989 | Nanbu et al. | 251/129.16 |
| 2002/0187380 A1 * | 12/2002 | Tanaka et al. | 429/34 |
| 2003/0186092 A1 * | 10/2003 | Takagi et al. | 429/12 |
| 2008/0057372 A1 * | 3/2008 | Sommer et al. | 429/34 |

FOREIGN PATENT DOCUMENTS

| | | |
|---|---|---|
| DE | 102 61 610 A1 | 7/2004 |
| DE | 10 2004 049 623 A1 | 4/2006 |
| JP | 10-281386 A | 10/1998 |
| JP | 10-318080 A | 12/1998 |
| JP | 2000-164236 A | 6/2000 |
| JP | 2001-317478 A | 11/2001 |
| JP | 2002-373687 A | 12/2002 |
| JP | 2003-288908 A | 10/2003 |
| JP | 2003-322326 A | 11/2003 |
| JP | 2004-165060 A | 6/2004 |
| JP | 2005-285427 A | 10/2005 |
| JP | 2005-302571 A | 10/2005 |
| JP | 2005-310553 A | 11/2005 |
| JP | 2005-310718 A | 11/2005 |
| JP | 2006-107979 A | 4/2006 |
| JP | 2006-114415 A | 4/2006 |
| JP | 2006-156054 A | 6/2006 |
| JP | 2006-221915 A | 8/2006 |

(Continued)

*Primary Examiner* — Cynthia Walls
(74) *Attorney, Agent, or Firm* — Kenyon & Kenyon LLP (57) ABSTRACT

A fuel cell system comprises a fuel cell, a reactant gas pipe for supplying a reactant gas to the fuel cell, and an injector for controlling the state of the gas on the upstream side in the reactant gas pipe and supplying the reactant gas to the downstream side by driving a valve element with an electromagnetic drive force at a predetermined drive cycle to separate the valve element from a valve seat. The injector is provided integrally in the fuel cell, and hence the vibration and noise of the injector can be absorbed and suppressed by the fuel cell as a heavy article.

15 Claims, 5 Drawing Sheets

(56) References Cited

FOREIGN PATENT DOCUMENTS

| JP | 2006-294492 A | 10/2006 |
| JP | 2007-52948 A | 3/2007 |
| JP | 2007-73293 A | 3/2007 |
| WO | WO 2006/037661 * | 4/2006 |

* cited by examiner

FUEL CELL SYSTEM

This is a 371 national phase application of PCT/JP2007/072707 filed 19 Nov. 2007, which claims priority to Japanese Patent Application No. 2006-315927 filed 22 Nov. 2006, the contents of which are incorporated herein by reference.

TECHNICAL FIELD

The present invention relates to a fuel cell system including an injector in a reactant gas pipe connected to a fuel cell.

BACKGROUND ART

At present, a fuel cell system including a fuel cell for receiving a supplied reactant gas (a fuel gas and an oxidizing gas) to generate a power has been suggested and put to practical use. In such a fuel cell system, a reactant gas pipe for allowing the fuel gas supplied from a fuel supply source such as a hydrogen tank to flow to the fuel cell is provided with a regulator which is subjected to on/off control to control the state of the gas (e.g., see Japanese Patent Application Laid-Open No. 2005-310718).

DISCLOSURE OF THE INVENTION

However, a conventional regulator disclosed in Patent Document 1 described above has a structure in which it is difficult to quickly change the supply pressure of a fuel gas (i.e., response is low), and additionally highly precise pressure regulation, for example, the multistage changing of a target pressure cannot be performed, so that it is considered to provide an electromagnetic drive type injector instead of the regulator.

However, the injector is turned on/off (valve opening/valve closing) by driving a valve element with an electromagnetic drive force to separate the valve element from a valve seat, so that vibration and noise are sometimes unavoidably generated at the time when the injector is turned on/off, and countermeasures against the vibration and noise are newly required. Moreover, when the injector is employed, delay or pressure reduction might be generated in the supply of the gas to a fuel cell, depending on the arrangement of the injector.

The present invention has been developed in view of such a situation, and an object thereof is to provide a fuel cell system capable of suppressing the generation of the vibration and noise due to the injector, the generation of the delay of the supply of the gas to the fuel cell, or the generation of pressure reduction.

To achieve the object, a fuel cell system according to the present invention is a fuel cell system comprising: a fuel cell; a reactant gas pipe which supplies a reactant gas to the fuel cell; and an injector which controls the state of the gas on the upstream side in the reactant gas pipe and supplies the reactant gas to the downstream side by driving a valve element with an electromagnetic drive force at a predetermined drive cycle to separate the valve element from a valve seat, wherein the injector is integrally provided in the fuel cell.

According to such a constitution, the vibration and noise of the injector can be absorbed and suppressed by the fuel cell as a heavy article. Moreover, since the injector is integrally provided in the fuel cell, a distance between the injector and the fuel cell can be shortened.

In the fuel cell system, when the reactant gas pipe includes an elastic portion, the elastic portion may be arranged in a case which receives the fuel cell. This elastic portion may be an insulator or a conductor.

In the fuel cell system, at least the downstream side of the injector may be connected to the fuel cell.

In the fuel cell system, when the fuel cell includes a plurality of rows of arranged fuel cell stacks, the injector may be arranged in the center between these fuel cell stacks.

In the fuel cell system, the injector may be supported by a support block via an elastic member.

In the fuel cell system, the support block may be connected to the fuel cell.

In the fuel cell system, in a case where in the fuel cell, the fuel cell stack in which the required number of unitary cells each receiving the supplied reactant gas to generate a power are stacked is sandwiched between a pair of end plates arranged at both ends of the stacking direction of the unitary cells and these end plates are connected to each other by a pair of tension plates arranged on both sides in a direction crossing the stacking direction at right angles, the whole support block is fixed to the fuel cell at two or more fixing points, and a line segment connecting the pair of tension plates to each other may be parallel to a line segment connecting the at least two fixing points to each other at a time when the end plates are viewed in the stacking direction.

In the fuel cell system, a ventilation hole of the case which receives the fuel cell may be provided in the face of the case other than the face of the case facing the injector.

According to such a constitution, noise generated by the injector can be prevented from leaking from the ventilation hole of the case.

In the fuel cell system, the injector may be covered with a sound insulator.

In the fuel cell system, an elastic member may be provided between the injector and the fuel cell.

According to such a constitution, resonance generated in a gap between the injector and the fuel cell can be suppressed.

In the fuel cell system, at least a part of the injector or at least a part of the sound insulator may be embedded in the fuel cell.

According to such a constitution, an area where the noise of the injector is radiated can be decreased.

In the fuel cell system, the injector may be arranged so that a direction in which the valve element is driven extends along a vertical direction.

In the fuel cell system, a gas inlet of the injector may be arranged on the upside in the vertical direction with respect to a gas outlet.

In the fuel cell system, an inlet side pipe to the injector in the reactant gas pipe may be fixed to the injector.

According to such a constitution, it is possible to suppress damage which might be generated in the inlet side pipe in a case where the fuel cell integrally provided with the injector is transferred.

In the fuel cell system, a signal line connecting connector of the injector may be provided in parallel with the face of the fuel cell on which the injector is arranged.

According to the present invention, the vibration and noise of the injector can be absorbed by the fuel cell as a heavy article, to suppress the generation of the vibration and noise due to the injector. Moreover, a distance between the injector and the fuel cell can be shortened, and the generation of the delay of the supply of the gas to the fuel cell and the generation of pressure reduction can be suppressed.

BEST MODE FOR CARRYING OUT THE INVENTION

Hereinafter, a fuel cell system 1 according to an embodiment of the present invention will be described with reference to the drawings.

Figure 1:
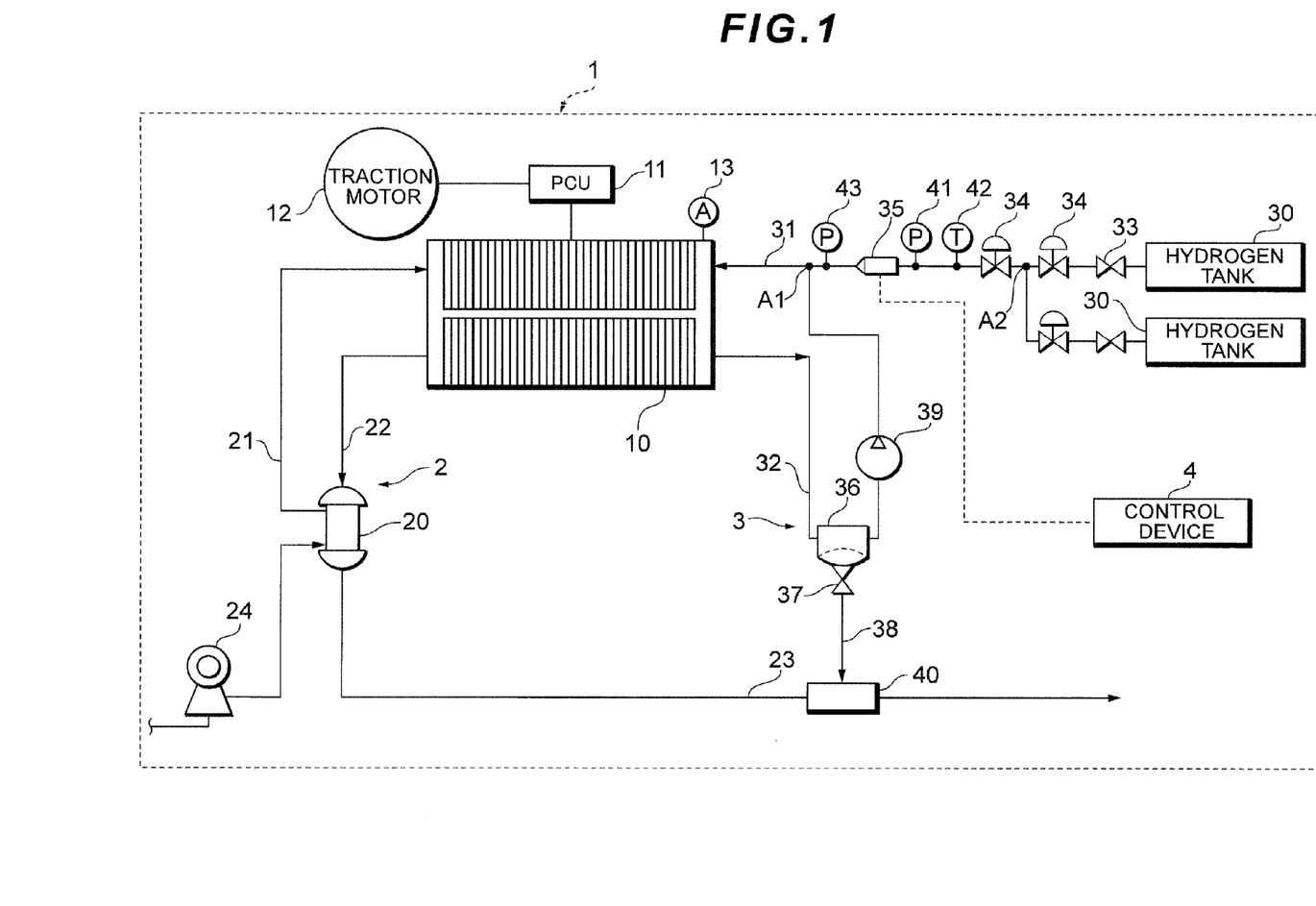
FIG. 1 is a constitution diagram of a fuel cell system according to an embodiment of the present invention.

FIG. 1 is a system constitution diagram of the fuel cell system 1. This fuel cell system 1 can be applied to a car-mounted power generation system for a fuel cell car, a power generation system for any mobile body such as a ship, an airplane, a train or a walking robot, a further stational power generation system for use as a power generation facility for a construction (a housing, a building or the like) or the like, and the system is specifically used for the car.

As shown FIG. 1, the fuel cell system 1 according to the present embodiment includes a fuel cell 10 which receives a supplied reactant gas (an oxidizing gas and a fuel gas) to generate a power, and also includes an oxidizing gas piping system 2 which supplies air as the oxidizing gas to the fuel cell 10, a hydrogen gas piping system 3 which supplies a hydrogen gas as the fuel gas to the fuel cell 10, a control device 4 which generally controls the whole system and the like.

The fuel cell 10 has a stack structure in which the required number of unitary cells 71 for receiving the supplied reactant gas to generate the power are stacked. The power generated by the fuel cell 10 is supplied to a power control unit (PCU) 11. The PCU 11 includes an inverter, a DC-DC converter and the like arranged between the fuel cell 10 and a traction motor 12. A current sensor 13 which detects a current during the power generation is attached to the fuel cell 10.

The oxidizing gas piping system 2 includes an air supply passage 21 which supplies the oxidizing gas (air) humidified by a humidifier 20 to the fuel cell 10, an air discharge passage 22 which guides an oxidizing off gas discharged from the fuel cell 10 to the humidifier 20 and an exhaust passage 23 for guiding the oxidizing off gas from the humidifier 20 to the outside. The air supply passage 21 is provided with a compressor 24 which takes the oxidizing gas from the atmosphere to feed the gas under pressure to the humidifier 20.

The hydrogen gas piping system 3 includes a hydrogen tank 30 as a fuel supply source in which the hydrogen gas having a high pressure (e.g., 70 MPa) is received, a hydrogen supply passage (a reactant gas pipe) 31 as a fuel supply passage for supplying the hydrogen gas of the hydrogen tank 30 to the fuel cell 10, and a circulation passage 32 for returning a hydrogen off gas discharged from the fuel cell 10 to the hydrogen supply passage 31.

It is to be noted that instead of the hydrogen tank 30, a reformer which forms a reformed hydrogen-rich gas from a hydrocarbon based fuel, and a high-pressure gas tank which brings the reformed gas formed by this reformer into a high pressure state to accumulate the pressure may be employed as the fuel supply source. Moreover, a tank having a hydrogen occluded alloy may be employed as the fuel supply source.

The hydrogen supply passage 31 is provided with a block valve 33 which blocks or allows the supply of the hydrogen gas from the hydrogen tank 30, regulators 34 which regulate the pressure of the hydrogen gas, and an injector 35. Moreover, on the upstream side of the injector 35 are provided a primary pressure sensor 41 and a temperature sensor 42 for detecting the pressure and the temperature of the hydrogen gas in the hydrogen supply passage 31. Furthermore, on the downstream side of the injector 35 and the upstream side of a joining part between the hydrogen supply passage 31 and the circulation passage 32, a secondary pressure sensor 43 which detects the pressure of the hydrogen gas in the hydrogen supply passage 31 is provided.

Each regulator 34 is a device which regulates an upstream pressure (the primary pressure) to a preset secondary pressure. In the fuel cell system 1 according to the present embodiment, a mechanical pressure reduction valve for reducing the primary pressure is employed as the regulator 34. As a constitution of the mechanical pressure reduction valve, a known constitution having a housing provided with a back pressure chamber and a pressure regulation chamber disposed via a diaphragm can be employed, and in the pressure regulation chamber, the primary pressure is reduced to a predetermined pressure to obtain the secondary pressure by a back pressure in the back pressure chamber.

Figure 2:
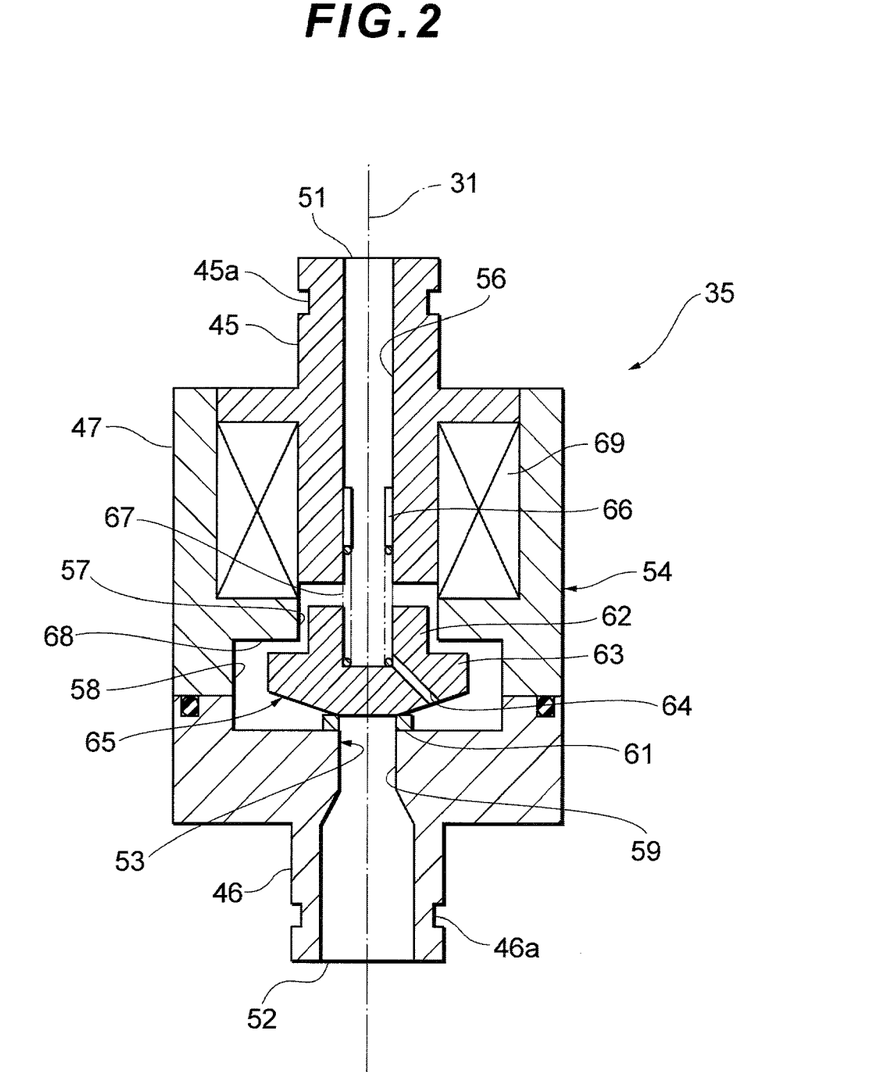
FIG. 2 is a sectional view showing an injector of the fuel cell system shown in FIG. 1.

FIG. 2 is a sectional view showing the injector 35. This injector 35 controls the state of the gas in the hydrogen supply passage 31, constitutes a part of the hydrogen supply passage 31, and has a metal cylinder 54 provided with an internal passage 53 which is arranged on the side of the hydrogen tank 30 in the hydrogen supply passage 31 in a port portion 51 formed inside a cylindrical portion 45 at one end of the cylinder in an axial direction, the internal passage being arranged on the side of the fuel cell 10 in the hydrogen supply passage 31 in a port portion 52 formed inside a cylindrical portion 46 at the other end of the cylinder in the axial direction, the cylindrical portion having the same axis as that of the one cylindrical portion 45.

This cylinder 54 is provided with a first passage portion 56 connected to the port portion 51; a second passage portion 57 connected to this first passage portion 56 on a side opposite to the port portion 51 and having a diameter larger than that of the first passage portion 56; a third passage portion 58 connected to this second passage portion 57 on a side opposite to the first passage portion 56 and having a diameter larger than that of the second passage portion 57; and a fourth passage portion 59 connected to this third passage portion 58 on a side opposite to the second passage portion 57 and having a diameter smaller than that of each of the second passage portion 57 and the third passage portion 58, and these portions constitute the internal passage 53. It is to be noted that the outer peripheral portion of the cylindrical portion 45 is provided with an annular seal groove 45a, and the outer peripheral portion of the cylindrical portion 46 is also provided with an annular seal groove 46a.

Moreover, the injector 35 has a valve seat 61 provided in a main body portion 47 formed between both the cylindrical portions 45 and 46 and having a diameter larger than that of each cylindrical portion so as to surround an opening of the fourth passage portion 59 on the third passage portion 58 side, the valve seat being constituted of a sealing member of, for example, rubber; a metal valve element 65 having a cylindrical portion 62 movably inserted into the second passage portion 57 and a bevel portion 63 arranged in the third passage portion 58 and having a diameter larger than that of the second passage portion 57, the bevel portion 63 being provided with an oblique communication hole 64; a spring 67 whose one end is inserted into the cylindrical portion 62 of the valve element 65 and whose other end is engaged with a stopper 66 formed in the first passage portion 56, to allow the valve element 65 to abut on the valve seat 61, thereby blocking the internal passage 53; and a solenoid 69 which moves the valve element 65 against the urging force of the spring 67 by an electromagnetic drive force until the valve element abuts on a stepped portion 68 of the third passage portion 58 on the side of the second passage portion 57, to separate the valve element 65 from the valve seat 61 and communicate with the internal passage 53 through the communication hole 64. Here, the valve element 65 operates along the axial direction of the cylinder 54.

The valve element 65 of the injector 35 is driven by energization control of the solenoid 69 as an electromagnetic drive device, and a pulse-like excitation current supplied to this solenoid 69 can be turned on/off to change the opening state of the internal passage 53 (in two stages, that is, a fully opened stage and a fully closed stage in the fuel cell system 1 according to the present embodiment). Moreover, the gas jet time and the gas jet timing of the injector 35 are controlled by a control signal output from the control device 4, so that the flow rate and the pressure of the hydrogen gas are precisely controlled.

To supply the gas to the downstream side of the injector 35 with a demanded flow rate, at least one of the opening state (the open degree) and the opening time by the valve element 65 provided in the internal passage 53 of the injector 35 is changed, to regulate the flow rate of the gas (or a hydrogen molar concentration) supplied to the downstream side (the fuel cell 10 side).

It is to be noted that the gas flow rate is regulated by the opening/closing of the valve element 65 of the injector 35, and additionally the pressure of the gas supplied to the downstream side of the injector 35 is reduced as compared with the gas pressure on the upstream side of the injector 35, and hence the injector 35 can be considered as a pressure regulation valve (a pressure reduction valve, a regulator). Moreover, in the fuel cell system 1 according to the present embodiment, the injector can be considered as a variable pressure regulation valve capable of changing the pressure regulation amount (the pressure reduction amount) of the upstream gas pressure of the injector 35 so that the pressure agrees with the demanded pressure in a predetermined pressure range in accordance with gas demand.

In the fuel cell system 1 according to the present embodiment, as shown in FIG. 1, the injector 35 is arranged on the upstream side from a joining part A1 between the hydrogen supply passage 31 and the circulation passage 32. Here, a plurality of hydrogen tanks 30 are employed as fuel supply sources, and hence the injector 35 is arranged on the downstream side from a part (a hydrogen gas joining part A2) where the hydrogen gases supplied from the hydrogen tanks 30 join one another.

The circulation passage 32 is connected to a discharge passage 38 via a gas-liquid separator 36 and a gas/water discharge valve 37. The gas-liquid separator 36 collects a water content from the hydrogen off gas. The gas/water discharge valve 37 operates in accordance with a command from the control device 4 to discharge (purge) to the outside the water content collected by the gas-liquid separator 36 and the hydrogen off gas including impurities in the circulation passage 32.

Moreover, the circulation passage 32 is provided with a hydrogen pump 39 which pressurizes the hydrogen off gas in the circulation passage 32 to feed the gas to the hydrogen supply passage 31. It is to be noted that the hydrogen off gas discharged through the gas/water discharge valve 37 and the discharge passage 38 is diluted by a dilution unit 40 to join the oxidizing off gas in the exhaust passage 23.

The control device 4 detects the operation amount of an accelerating operation device (an accelerator or the like) provided in the vehicle, and receives control information such as a demanded acceleration value (a demanded power generation amount from a load device such as the traction motor 12) to control the operations of various devices in the system. It is to be noted that the load device generically includes power consumption devices including, in addition to the traction motor 12, auxiliary devices necessary for operating the fuel cell 10 (e.g., motors of the compressor 24, the hydrogen pump 39, a cooling pump and the like), actuators used in various devices (a change gear, a wheel control device, a steering device, a suspension device, etc.) associated with the running of the vehicle, an air conditioning device (an air conditioner), lighting and audio for a passenger space and the like.

The control device 4 is constituted of a computer system (not shown). Such a computer system includes a CPU, an ROM, an RAM, an HDD, an input/output interface, a display and the like, and the CPU reads and executes various control programs recorded in the ROM to realize various control operations.

The control device 4 outputs a control signal for realizing the total jet time of the injector 35 calculated through a predetermined procedure, whereby the gas jet time and the gas jet timing of the injector 35 are controlled to regulate the flow rate and the pressure of the hydrogen gas to be supplied to the fuel cell 10.

During the usual operation of the fuel cell system 1, the hydrogen gas is supplied from the hydrogen tank 30 to a fuel pole of the fuel cell 10 through the hydrogen supply passage 31, and the humidified and regulated air is supplied to an oxidation pole of the fuel cell 10 through the air supply passage 21, to generate a power. In this case, a power (a demanded power) to be extracted from the fuel cell 10 is calculated by the control device 4, and the hydrogen gas and air are supplied into the fuel cell 10 as much as amounts corresponding to the amount of the generated power.

Figure 3:
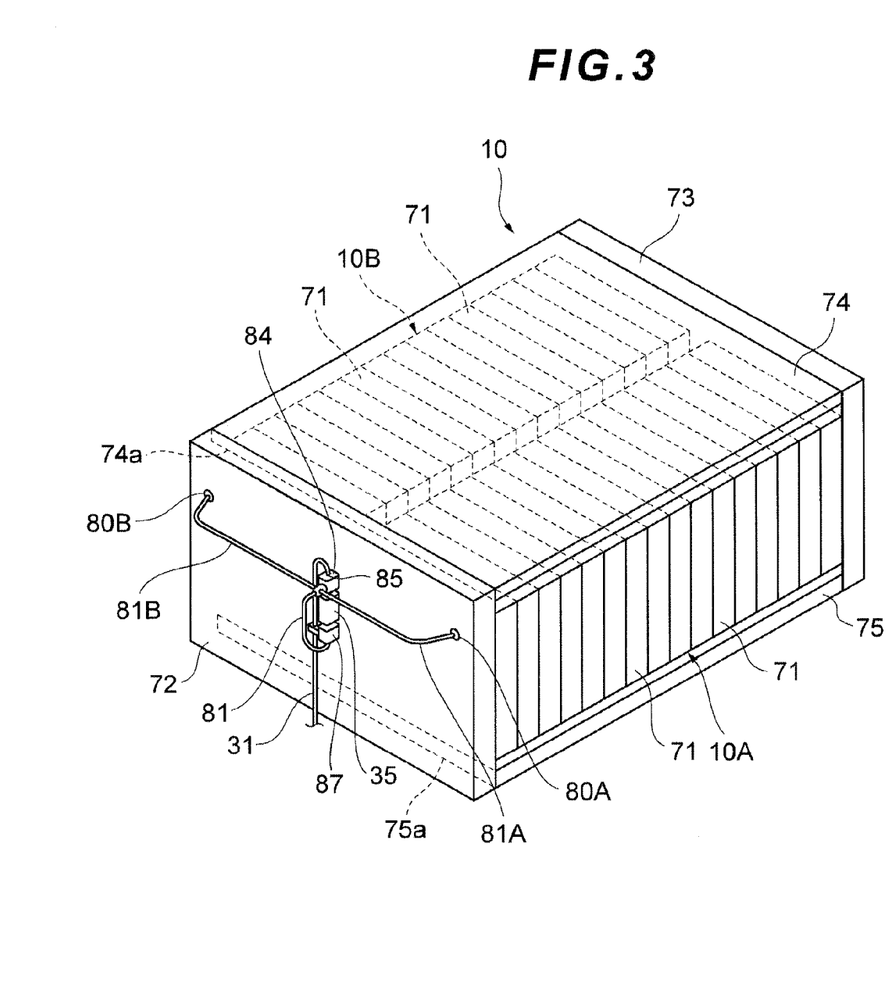
FIG. 3 is a perspective view showing a fuel cell of the fuel cell system shown in FIG. 1.

As shown in FIG. 3, in the fuel cell 10, a pair of fuel cell stacks 10A, 10B each having a constitution in which the required number of the rectangular unitary cells 71 for receiving the supplied reactant gas to generate the power are stacked are arranged while the stacking directions of the unitary cells 71 are parallel to each other, and the stacks are sandwiched between a pair of common end plates 72 and 73 arranged at both ends of the cells in the stacking direction.

It is to be noted that these end plates 72, 73 are connected to each other via a pair of tension plates 74, 75 arranged on both sides in a direction crossing the arrangement direction of the fuel cell stacks 10A, 10B at right angles.

Figure 4:
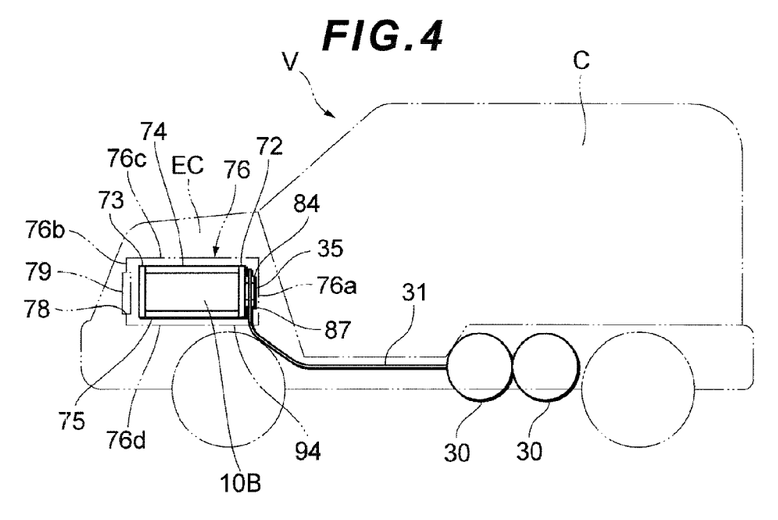
FIG. 4 is a side view schematically showing a car on which the fuel cell system shown in FIG. 1 is mounted.

As shown in FIG. 4, this fuel cell 10 is received in a substantially rectangular parallelepiped stack case 76 and mounted in a car V. In this mounted state, the fuel cell 10 having such a posture that the fuel cell stacks 10A, 10B are arranged in a horizontal direction is installed in an engine compartment EC provided on the front side of the car V. At this time, the pair of end plates 72, 73 are arranged at both ends in a car body front-to-rear direction, and the pair of tension plates 74, 75 are vertically arranged. Hereinafter, the fuel cell will be described with this posture during the installation.

The injector 35 is provided integrally on the one end plate 72 on the rear side of the fuel cell 10 in a vehicle front-to-rear direction. On the other hand, the face of the stack case 76 for receiving the fuel cell 10, that is, the face other than a rear face 76a facing the injector 35, the face which is not disposed between the injector 35 and a passenger chamber C, specifically a front face 76b is provided with a ventilation hole 78 connecting the inside to the outside.

This ventilation hole 78 is provided with a filter 79 which allows the passing of vapor while regulating the passing of hydrogen. It is to be noted that the ventilation hole 78 may be provided in another face such as an upper face 76c or a side face, as long as the face is a face other than the face facing the injector 35, and the face is not disposed between the injector 35 and the passenger chamber C.

As shown in FIG. 3, the pair of end plates 72, 73 are disposed in common with the plurality of fuel cell stacks 10A, 10B, and hence have a substantially rectangular shape which is long in a car width direction, and the injector 35 is integrally provided in the center between the fuel cell stacks 10A and 10B of a plurality of rows (two rows in FIG. 3) arranged in the one end plate 72 on the rear side in the vehicle front-to-rear direction.

Here, the fuel cell stacks 10A, 10B have mutually opposite polarities on the end plate 72 side, and hence hydrogen supply ports 80A, 80B for supplying the hydrogen gases to the respective stacks in the shortest distance are arranged symmetrically in the length direction of the end plate 72. In consequence, since the injector 35 is arranged as described above, the lengths of pipe portions 81A, 81B branching from a pipe 81 extending from the injector 35 in the hydrogen supply passage 31 and connected to the respective hydrogen supply ports 80A, 80B can be set to an equal length.

Figure 5:
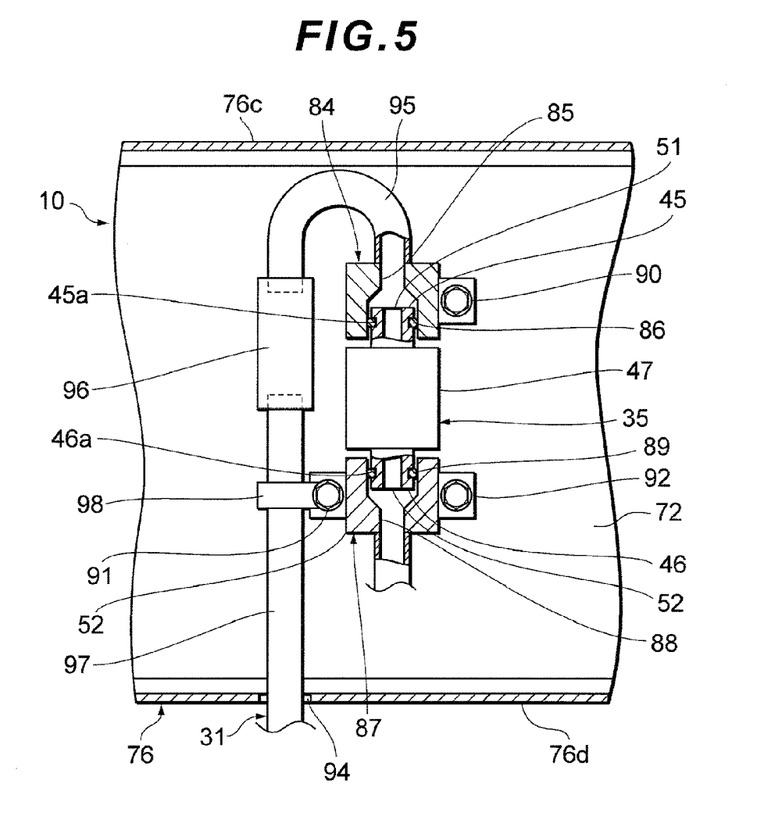
FIG. 5 is a partially enlarged front view showing a section of a part of the fuel cell of the fuel cell system shown in FIG. 1.

More specifically, as shown in FIG. 5, the cylindrical portion 45 of the injector 35 on an inlet side is fitted into a hole portion 85 of a support block 84 made of a metal via an O-ring 86 as an elastic member arranged in the seal groove 45a, and the cylindrical portion 46 on an outlet side is fitted into a hole portion 88 of a support block 87 made of a metal via an O-ring 89 as an elastic member arranged in the seal groove 46a.

Moreover, the one support block 84 arranged on the upside is fixed to the end plate 72 by a bolt in one fastening portion (the fixing point) 90, and the other support block 87 arranged on the downside is fixed to the end plate 72 by bolts in two fastening portions (fixing points) 91, 92 on both sides. The two fastening portions 91, 92 connecting this support block 87 to the end plate 72 are connected to each other along a horizontal line.

As described above, the injector 35 is provided in the end plate 72 while the axial direction of the injector, that is, a valve element drive direction (the moving direction of the valve element 65) is a vertical direction, and both sides of the injector are supported by the support blocks 84, 87 via the O-rings 86, 89 as the elastic members. In consequence, the cylindrical portion 45 on the upstream side of the injector 35 and the cylindrical portion 46 on the downstream side are connected to the fuel cell 10 via the pair of support blocks 84, 87, and these cylindrical portions 45, 46 are warmed by heat generated by the fuel cell 10 and conducted through the support blocks 84, 87. Moreover, the port portion 51 of the injector 35 as a gas inlet is arranged above the port portion 52 as a gas outlet in the vertical direction.

Furthermore, the support blocks 84, 87 are connected to the end plate 72 of the fuel cell 10 by the three fastening portions 90, 91 and 92 as a whole, and the two fastening portions 91, 92 for connecting the lower support block 87 to the end plate 72 are arranged in parallel with the extending direction of connecting portions 74a, 75a of the tension plates 74, 75 with respect to the end plate 72 shown in FIG. 3.

It is to be noted that the support blocks 84, 87 may be connected to the end plate 72 at not three points but four points as a whole. However, with two points or less, the injector 35 cannot stably be supported. With five or more points, the number of the support points is excessively large, and hence there is a high possibility that the fastening portions loosen owing to the deformation of the end plate 72 or the like, and either case is unfavorable.

Here, as shown in FIG. 4, the hydrogen supply passage 31 extending from the hydrogen tanks 30 provided in the rear part of the car V passes under a floor of the passenger chamber C of the car V, is guided into the engine compartment EC, and is introduced into the stack case 76 through a hole portion 94 formed in a lower face 76d of the stack case 76. Furthermore, as shown in FIG. 5, the hydrogen supply passage passes by the side of the injector 35, and is connected to the upper support block 84. Thus, the hydrogen supply passage 31 connected to the support block 84 communicates with the hole portion 85, and communicates with the port portion 51 of the injector 35 through this hole portion 85.

It is to be noted that the hydrogen supply passage 31 on the side connected to the support block 84 is divided into a metal pipe portion 95 connected to the support block 84 and having a U-shape, an insulating pipe portion (an elastic portion) 96 constituted of an elastic member connected to this pipe portion 95, and a metal pipe portion (an inlet side pipe) 97 connected to this insulating pipe portion 96. Moreover, the insulating pipe portion 96 electrically insulates the hydrogen supply passage 31 which connects the fuel cell 10 having a high potential to an earthed body of each hydrogen tank 30, and this insulating pipe portion 96 is arranged in the stack case 76.

Moreover, the middle portion of the pipe portion 97 inserted through the hole portion 94 of the lower face 76d of the stack case 76 is fixed to a bracket 98 fastened together to the fastening portion 91 which fixes the support block 87 to the end plate 72. This stabilizes the posture of the pipe portion 97, because the posture of the insulating pipe portion 96 as the elastic member is not stabilized as it is.

According to the fuel cell system 1 of the present embodiment described above, since the injector 35 is provided integrally in the fuel cell 10, vibration and noise generated in the injector 35 can be absorbed, decayed and suppressed by the fuel cell 10 as a heavy article. Therefore, the operation sound of the injector 35 conducted to a passenger in the passenger chamber C can be suppressed. Moreover, since the injector 35 is provided integrally in the fuel cell 10, a distance between the injector 35 and the fuel cell 10 can be shortened, and eventually the generation of the delay of the supply of the gas to the fuel cell 10 and the generation of pressure reduction can be suppressed.

Moreover, the hydrogen supply passage 31 connects the high-voltage fuel cell 10 to the earthed body of the hydrogen tank 30. For this purpose, the middle of the passage includes the insulating pipe portion 96 made of an elastic material (a rubber or a resin), but the insulating pipe portion 96 made of the material which easily emits sound is arranged in the stack case 76 for receiving the fuel cell 10, and hence the sound radiated from the insulating pipe portion 96 in the stack case 76 can be prevented from being radiated to the outside.

Furthermore, since the cylindrical portions 45, 46 on the upstream side and the downstream side of the metal cylinder 54 of the injector 35 are connected to the fuel cell 10 via the metal support blocks 84, 87, the upstream side and the downstream side of the injector 35 can effectively be warmed by the afterheat of the fuel cell 10.

For example, in a case where the hydrogen gas having a remarkably low temperature is supplied to the injector 35 during continuous running at a high speed or the like, especially on the downstream side, as compared with the upstream side, the temperature of the hydrogen gas passed through the valve element 65 further lowers owing to insulating expansion, but the cylindrical portion 46 on the downstream side can be warmed to suppress the hardening of the rubber valve seat 61, a rubber seal member on the downstream side or the like at a low temperature. Therefore, it is possible to lower the necessity of limiting the output of the fuel cell 10 which suppresses the hardening at the low temperature by the limiting of the flow rate of the hydrogen gas.

In addition, since the injector 35 is arranged in the center between the plurality of rows of the arranged fuel cell stacks 10A and 10B, the lengths of the pipe portions 81A, 81B from the injector 35 to the hydrogen supply ports 80A, 80B can be set to an equal length, and the hydrogen gas is satisfactorily distributed and supplied to the fuel cell stacks 10A, 10B.

Moreover, since the injector 35 is supported by the support blocks 84, 87 via the O-rings 86, 89 as the elastic members, the vibration of the injector 35 as a vibrator can be decayed by the O-rings 86, 89, and the vibration and noise generated by the injector 35 can further be suppressed.

Furthermore, both the support block 84 for supporting the cylindrical portion 45 on the inlet side of the injector 35 and the support block 87 for supporting the cylindrical portion 46 on the outlet side are fixed to the fuel cell 10, and hence even the vibration transmitted from either the support block 84 or 87 can be decayed by the fuel cell 10 as the heavy article.

In addition, since the support blocks 84, 87 are entirely connected to the fuel cell 10 at three points, the injector 35 can adequately be connected to the fuel cell 10.

Figure 6:
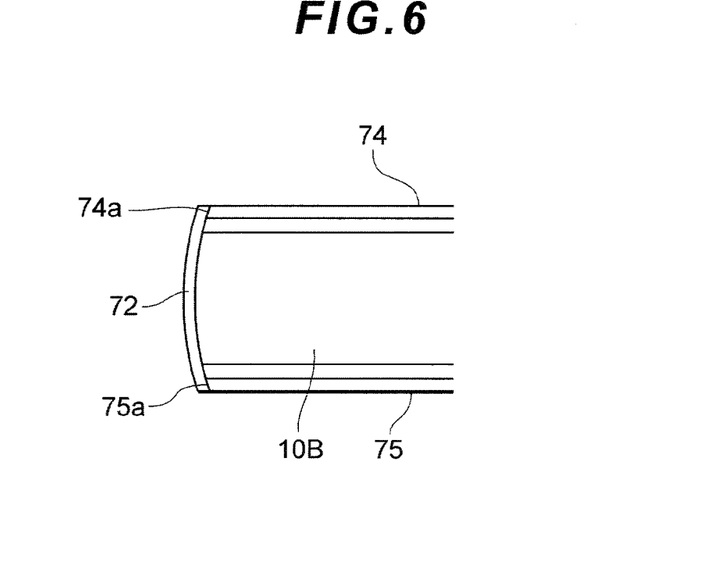
FIG. 6 is a side view showing a deformed image of an end plate of the fuel cell of the fuel cell system shown in FIG. 1.

Moreover, the two fastening portions 91, 92 for connecting the lower support block 87 to the fuel cell 10 are arranged in parallel with the extending direction of the connecting portions 74a, 75a of the tension plates 74, 75 to the end plate 72, and hence with respect to the deformation of the end plate 72 due to the swelling of the fuel cell 10, that is, the deformation of the end plate 72 in a direction crossing the connecting portions 74a, 75a at right angles as shown in FIG. 6, positional deviation generated in the two fastening portions 91, 92 can be minimized. Therefore, loosening of the fastening portions 91, 92 generated by a load due to the deformation of the end plate 72 can be suppressed.

In addition, since the ventilation hole 78 connecting the inside of the stack case 76 which receives the fuel cell 10 to the outside is provided in the front face 76b as the face other than the face facing the injector 35, the noise of the injector 35 can be prevented from leaking from the stack case 76 to the outside through the ventilation hole 78. In addition, since the ventilation hole 78 is provided in the front face 76b as the face of the stack case 76 that is not disposed between the injector 35 and the passenger chamber C, the noise of the injector 35 that leaks from the stack case 76 to the outside through the ventilation hole 78 can be prevented from being conducted to the passenger chamber C.

Moreover, in a case where the injector 35 is arranged while the valve element drive direction is a horizontal direction, gravity is applied to the valve element 65 in a direction different from the moving direction, a load applied to the lower part of the valve element deviates or tilts owing to the function of the gravity, and biased wear sometimes occurs. However, since the injector is arranged while the valve element drive direction is a vertical direction, the moving direction of the valve element 65 agrees with the direction of the gravity, and any biased load is not generated in the valve element 65, but the above biased wear can be prevented. Therefore, the durability of the injector 35 can be improved.

Furthermore, the injector 35 is arranged so as to dispose the port portion 51 as the gas inlet on the upside of the port portion 52 as the gas outlet in the vertical direction. Therefore, even when the highly humid hydrogen off gas is introduced from the fuel cell 10 to the circulation passage 32 that joins the downstream side of the injector 35 of the hydrogen supply passage 31, dew condensation water generated by the vapor of the gas can be prevented from being guided to the injector 35. In consequence, freezing/securing generated in the injector 35 at a system stop can be suppressed.

In addition, the pipe portion 97 disposed on the inlet side of the injector 35 in the hydrogen supply passage 31 is fixed to the bracket 98 fastened together to the fastening portion 91 for fixing the support block 87 to the end plate 72.

Therefore, in a case where the fuel cell 10 is received in the stack case 76 while the pipe portion 95, the insulating pipe portion 96 and the pipe portion 97 are attached to the fuel cell 10 together with the support blocks 84, 87 and the injector 35, the pipe portion 97 needs to be inserted through the hole portion 94 of the lower face 76d of the stack case 76, but the insulating pipe portion 96 is an elastic member. Therefore, the posture of the pipe portion 97 whose posture is not stable as it is can be stabilized by the bracket 98, whereby an attaching operation is facilitated, and additionally breakdown or the like can be suppressed.

Moreover, when the posture of the pipe portion 97 is not stable during transport, the pipe portion 97 can easily collide with another component or the like. However, since the posture of the pipe portion 97 is stable, the breakdown due to such collision can be suppressed.

Figure 7:
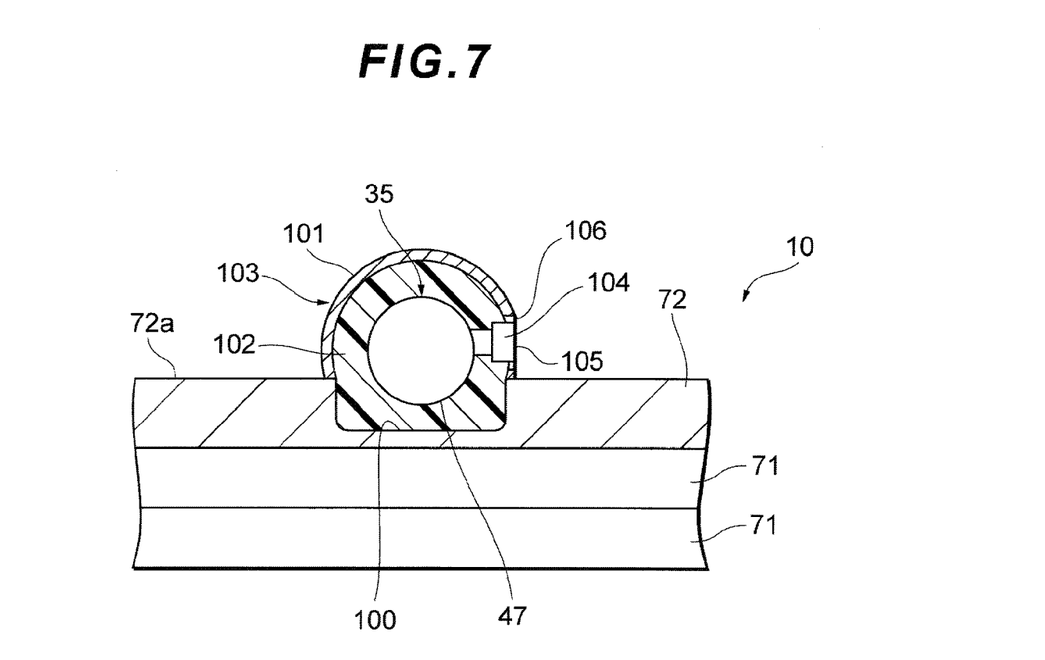
FIG. 7 is a partially sectional view of a modification showing a section around the injector of the fuel cell system shown in FIG. 1.

It is to be noted that in the fuel cell system 1 according to the above embodiment, as shown in FIG. 7, the end plate 72 in which the injector 35 is arranged is provided with a recessed portion 100 into which a part of the main body portion 47 of the injector 35 fits, a curved plate-like hard sound insulator 101 is arranged to cover the injector 35, and a gap between the recessed portion 100 and the sound insulator 101 and the injector 35 may be filled with a soft elastic material (a soft layer) 102.

In consequence, the elastic material 102 is provided between the injector 35 and the fuel cell 10, and a part of the injector 35 is embedded in the fuel cell 10. It is to be noted that the sound insulator 101 and the elastic material 102 constitute a sound absorbing cover 103 which covers the injector 35.

Thus, when the injector 35 is covered with the sound insulator 101, the spread of the noise from the injector 35 can be suppressed. Moreover, when the elastic material 102 is provided on the inner side of the sound insulator 101 including the gap between the injector 35 and the fuel cell 10, the resonance of the noise from the injector 35 in the gap can be prevented, to further suppress the spread of the noise. In addition, since a part of the injector 35 is embedded in the fuel cell 10, an area where the noise of the injector 35 is radiated can be decreased. Furthermore, since even a part of the elastic material 102 is embedded in the fuel cell 10, the volume of the elastic material 102 can be maximized. It is to be noted that the sound insulator 101 may be arranged in the recessed portion 100 to embed the sound insulator 101 in the fuel cell 10. According to such a constitution, the area where the noise of the injector 35 is radiated can be decreased by the sound insulator 101.

Here, in the injector 35, a signal line connecting connector 104 for connecting a signal line for the communication of the control signal from the control device 4 to the injector 35 is arranged in parallel with an arrangement face 72a for the injector 35 in the end plate 72, so that a port portion 105 as a connecting portion between the signal line connecting connector 104 and the signal line is disposed in parallel with the arrangement face 72a. Therefore, in the sound insulator 101, an opening 106 for exposing the signal line connecting connector 104 to the outside is formed on the side of the end plate 72.

Thus, when the signal line connecting connector 104 of the injector 35 is arranged in parallel with the arrangement face 72a of the injector 35 of the fuel cell 10, the operation sound of the injector 35 which spreads from the port portion 105 can be decreased by the fuel cell 10 while maintaining the satisfactory connecting operation properties of the signal line (not shown) to the signal line connecting connector 104. Moreover, the operation sound of the injector 35 which spreads from the port portion 105 does not have to be directed to the passenger chamber C. In consequence, the operation sound of the injector 35 transmitted to the passenger in the passenger chamber C can be suppressed.

The invention claimed is:

1. A fuel cell system comprising: a fuel cell; a reactant gas pipe which supplies a reactant gas to the fuel cell; and an injector which controls the state of the gas on the upstream side in the reactant gas pipe and supplies the reactant gas to the downstream side by driving a valve element with an electromagnetic drive force at a predetermined drive cycle to separate the valve element from a valve seat,
   wherein the injector is integrally provided in a pair of end plates of the fuel cell,
   the reactant gas pipe includes an elastic portion, and this elastic portion is arranged in a case which receives the fuel cell; and
   wherein an elastic member may be provided between the injector and the fuel cell.

2. The fuel cell system according to claim 1, wherein in the fuel cell, a fuel cell stack in which the required number of unitary cells each receiving the supplied reactant gas to generate a power are stacked is sandwiched between the pair of end plates arranged at both ends of the stacking direction of the unitary cells and these end plates are connected to each other by a pair of tension plates arranged on both sides of the stack in a direction crossing the stacking direction at right angles.

3. The fuel cell system according to claim 1, wherein at least the downstream side of the injector is connected to the fuel cell.

4. The fuel cell system according to claim 2, wherein the fuel cell includes a plurality of rows of arranged fuel cell stacks sandwiched between the common end plates, and the injector is arranged at the center of the direction of the end plates along a direction in which the plurality of rows of arranged fuel cells are arranged.

5. The fuel cell system according to claim 1, wherein the injector is connected to a support block, and the injector is supported by the support block via an elastic member.

6. A fuel cell system comprising: a fuel cell; a reactant gas pipe which supplies a reactant gas to the fuel cell; and an injector which controls the state of the gas on the upstream side in the reactant gas pipe and supplies the reactant gas to the downstream side by driving a valve element with an electromagnetic drive force at a predetermined drive cycle to separate the valve element from a valve seat,
   wherein in the fuel cell, a fuel cell stack in which the required number of unitary cells each receiving the supplied reactant gas to generate a power are stacked is sandwiched between a pair of end plates arranged at both ends of the stacking direction of the unitary cells,
   while the injector is covered with a sound insulator, at least a part of the injector or at least a part of the sound insulator is embedded in the end plates, and
   wherein an elastic member is provided between the injector and the fuel cell.

7. The fuel cell system according to claim 5, wherein in the fuel cell, the fuel cell stack in which the required number of unitary cells each receiving the supplied reactant gas to generate a power are stacked is sandwiched between a pair of end plates arranged at both ends of the stacking direction of the unitary cells and these end plates are connected to each other by a pair of tension plates arranged on both sides in a direction crossing the stacking direction at right angles,
   the whole support block is fixed to the fuel cell at two or more fixing points, and
   the extending directions of connecting portions of the tension plates to the end plates is parallel to a line segment connecting two fixing points of the fixing points to each other at a time when the end plates are viewed in the stacking direction.

8. The fuel cell system according to claim 1, wherein a ventilation hole of the case which receives the fuel cell is provided in the face of the case other than the face of the case facing the injector.

9. The fuel cell system according to claim 1, wherein the injector is covered with a sound insulator.

10. The fuel cell system according to claim 2, wherein, while the injector is covered with a sound insulator, at least a part of the injector or at least a part of the sound insulator is embedded in the fuel cell.

11. The fuel cell system according to claim 1, wherein the injector is arranged so that a direction in which the valve element is driven extends along a vertical direction.

12. The fuel cell system according to claim 11, wherein a gas inlet of the injector is arranged on the upside in the vertical direction with respect to a gas outlet.

13. The fuel cell system according to claim 1, wherein an inlet side pipe to the injector in the reactant gas pipe is fixed to the injector.

14. The fuel cell system according to claim 1, wherein a signal line connecting connector of the injector is provided in parallel with the face of the fuel cell on which the injector is arranged.

15. The fuel cell system according to claim 2, wherein while an elastic member is provided between the injector and the end plate, at least a part of the injector is embedded in the end plate.

* * * * *

UNITED STATES PATENT AND TRADEMARK OFFICE
CERTIFICATE OF CORRECTION

PATENT NO.       : 8,546,034 B2
APPLICATION NO. : 12/445856
DATED            : October 1, 2013
INVENTOR(S)      : Katano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this
Fifteenth Day of September, 2015

Michelle K. Lee
*Director of the United States Patent and Trademark Office*